HAND TOOL FOR CUTTING TRANSISTOR LEADS

Filed Aug. 25, 1966

INVENTORS
William M. Halstead
Andrew D. Saunders
BY
Munson H. Lane
ATTORNEY

United States Patent Office 3,337,953

Patented Aug. 29, 1967

3,337,953

HAND TOOL FOR CUTTING TRANSISTOR LEADS

William M. Halstead, P.O. Box 195, Linthicum Heights, Md. 21090, and Andrew D. Saunders, Silver Spring, Md.; said Saunders assignor to said Halstead Filed Aug. 25, 1966, Ser. No. 574,959
6 Claims. (Cl. 30—233)

This invention relates to new and useful improvements in tools for use in the electronics industry, and the principal object of the invention is to facilitate simultaneous cutting of multiple leads of transistors to a predetermined length.

A conventional transistor is usually provided with three terminal leads, while so-called integrated transistors which have been recently developed may have anywhere from three to ten or more leads. Such transistors, instead of being soldered in place, are often removably installed in sockets, much in the manner of conventional electronic tubes, each socket having a plurality of apertures or recesses to receive the respective leads of the transistor. Inasmuch as different sockets vary as to depth, the transistor leads are usually an inch or so in length and require to be cut off so as to accurately match the depth of the particular socket in which a particular transistor is to be installed.

As a practical matter, it is not possible to simply cut the several leads of a transistor in one operation as by a pair of scissors, for example, since the leads would become bunched together in cutting and would be cut to unequal lengths and at different angles and, as a result, they would not accurately fit the socket. Thus, in conventional practice it is customary to cut the several leads of a transistor one by one. This, of course, is a very tedious procedure which, even at best, provides no assurance that all the leads have been uniformly cut.

As already stated, the invention facilitates simultaneous cutting of multiple transistor leads to a predetermined length, this being achieved by the provision of a hand tool which properly holds a transistor with its leads in place while the cutting operation is quickly, easily and accurately performed. The cutting tool of the invention is very simple in construction and is readily adjustable so as to vary the cut off length of the leads as necessary for installation of a transistor in a socket of a given depth. Also, the cutting tool is adapted to accommodate transistors of different sizes and types, having different numbers and arrangement of leads.

With the foregoing more important object and features in view and such other objects and features as may become apparent as this specification proceeds, the invention will be understood from the following description taken in conjunction with the accompanying drawings, wherein like characters of reference are used to designate like parts, and wherein.

Referring now to the accompanying drawings in detail, the invention comprises a hand tool designated generally by the numeral 10 which is particularly intended for use in the electronics industry to facilitate simultaneous cutting of multiple leads of transistors to a predetermined length.

Figure 4:
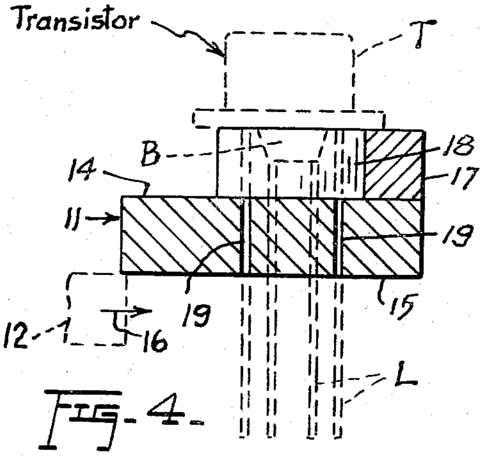
FIGURE 4 is an enlarged, fragmentary cross-sectional view, taken substantially in the plane of the line 4—4 in FIGURE 1.

For illustrative purposes, a typical transistor T is shown by dotted lines in FIG. 4, the transistor having a plurality of terminal leads L projecting from the bottom thereof, such leads usually being about an inch or so in length and being intended to be cut off in order to match the depth of the socket (not shown) in which the transistor is to be installed. In some instances a central boss B may exist at the underside of the transistor between the group of leads, when the leads are arranged in a circular pattern. In other instances the boss may not exist, as for example where only three leads are present in a straight row formation.

The cutting tool 10 comprises a pair of arms or levers 11, 12 which are pivotally connected together by a pivot 13 located adjacent one end of these levers. The lever 11 has upper and lower surfaces 14, 15, respectively, and the lever 12 cooperates with the lower surface 15 of the lever 11 in a shearing manner, when the levers are swung together as indicated by the arrow 16.

Figures 1, 2:
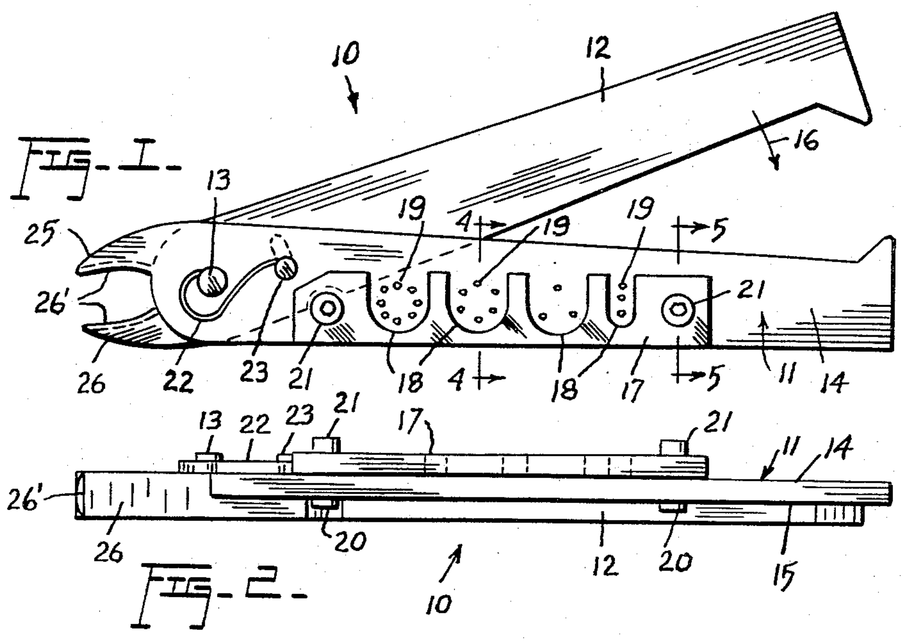
FIGURE 1 is a top plan view of the cutting tool of the invention.
FIGURE 2 is a side elevational view thereof.
Figure 3:
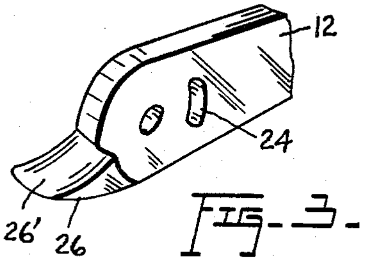
FIGURE 3 is a fragmentary perspective view of one of the levers.

A gauge plate 17 is mounted on the upper surface 14 of the lever 11 as will be hereinafter described. The gauge plate is provided with a plurality of recesses or notches 18 which are open at the top and bottom and preferably also at one side edge of the gauge plate, as will be clearly apparent. Portions of the lever 11 in register with the recesses 18 are provided with groups of apertures 19 for reception of transistor leads, it being observed that the several recesses 18 and several groups of the apertures 19 are provided in order that the same tool may selectively accommodate different transistors having different number and arrangement of leads. Thus for example, the recess 18 at the extreme left as viewed in FIG. 1 is in register with a group of eight apertures 19 arranged in a circular pattern to accommodate a transistor with eight leads set in a circle. At the extreme right in FIG. 1, the apertures are three in a straight row to accommodate a transistor with three leads in a row, in which instance the overlying recess 18 may be relatively narrow as compared to the others.

In any event, when the tool is to be used, the transistor T is seated on top of the gauge plate 17 as shown in FIG. 4, and the several leads L of the transistor are extended downwardly through the applicable recess 18 and through the applicable group of the apertures 19, so that the leads project downwardly through the lever 11, as illustrated. If the transistor includes the central boss B, such a boss is conveniently accommodated within the recess of the gauge plate, as indicated. Then, by swinging the levers 11, 12 together about the pivot 13 as indicated by the arrow 16, the shearing action of the lever 12 at the lower surface 15 of the lever 11 will quickly and accurately cut off all the leads in one simple operation, it being noted that all the leads are cut to exactly the same length and in a common plane.

Figure 5:
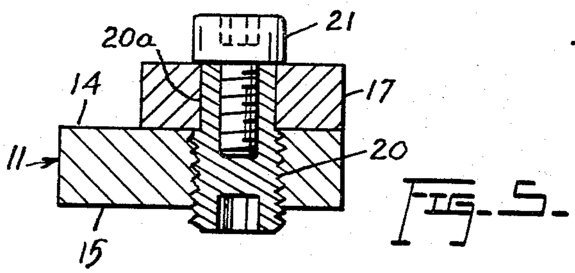
FIGURE 5 is an enlarged, fragmentary cross-sectional view, taken substantially in the plane of the line 5—5 in FIGURE 1.

As already indicated, it is desirable to provide an adjustment whereby the cut off length of the leads may be varied to suit sockets of different depths. The invention affords this adjustment in the mounting means which are employed for securing the gauge plate 17 to the lever 11, as shown in detail in FIG. 5. Such mounting means comprise a pair of screws 20 which are screw-threaded upwardly through the lever 11 and have diametrically reduced upper portions **20*a* passing freely through apertures in the gauge plate 17. The screws 20 are formed in their upper end portions with blind screw-threaded bores to receive additional screws 21 which have enlarged heads in abutment with the top surface of the gauge plate 17**, whereby to hold the gauge plate assembled to the lever 11. As shown in FIG. 5, the gauge plate is located directly on the upper surface 14 of the lever 11, in which event the cut off length of the leads L will correspond to the combined thickness of the gauge plate 17 and lever 11. However, by adjusting the screws 20 in the lever 11, the gauge plate may be raised away from the upper surface 14 of the lever, thus correspondingly increasing the distance from the top of the gauge plate to the lower surface 15 of the lever, and accordingly increasing the cut off length of the leads. It will be understood that during adjustment of the screws 20 in the lever 11, the screw portions 20*a* simply rotate in the gauge plate 17, while the gauge plate is held on the screw portions 20*a* by the screws 21 and becomes raised or lowered together with the adjustment of the screws 20, as the case may be.

Means are also provided for resiliently biasing the levers 11, 12 apart about the pivot 13, so that the transistor leads may be readily inserted into the appropriate group of apertures 19 without obstruction by the lever 12 such as could occur if the levers were swung together as in cutting. These biasing means consist of a suitable spring 22 which has one end thereof suitably anchored to the pivot 13, while its other end is similarly anchored to a pin 23 carried by the lever 11. In such an arrangement the pivot 13 may be rigidly secured to the lever 12 but rotatable in the lever 11, and the spring 22 will resiliently bias the levers apart. The pin 23 may also serve a further function of limiting the spreading movement of the levers under the bias of the spring 22, this being achieved by providing the lever 12 with an arcuate slot 24 concentric with the pivot 13. The pin 23 projects into the slot 24 and thus serves the movement limiting function as above noted.

When the transistor is installed in its socket, it is rather difficult to remove it inasmuch as the socket firmly grips the transistor leads. In conventional practice such removal is usually performed with the use of ordinary pliers, but the usual flat jaw faces of such pliers do not properly grip the cylindrical body of the transistor and, as a result, both the transistor and the socket very often become damaged. In order to eliminate this difficulty, the tool of the invention provides a pair of jaws 25, 26 integrally with the respective levers 11, 12 adjacent the pivot 13, the jaws 25, 26 having transversely concave faces 26' to complementally engage and properly grip the cylindrical body of the transistor and thereby facilitate expeditious removal of the transistor from its socket, when that becomes necessary.

While in the foregoing there has been described and shown the preferred embodiment of the invention, various modifications may become apparent to those skilled in the art to which the invention relates. Accordingly, it is not desired to limit the invention to this disclosure, and various modifications and equivalents may be resorted to, falling within the spirit and scope of the invention as claimed.

What is claimed as new is:

1. A hand tool for simultaneously cutting multiple leads of a transistor to a predetermined length, said hand tool comprising a first lever having upper and lower surfaces, a gauge plate mounted on the upper surface of said first lever, said gauge plate being provided with at least one transistor seating recess open at the top and bottom of the gauge plate, said first lever being provided with at least one group of transistor lead receiving apertures in register with said recess in the gauge plate, and a second lever pivoted to the first lever in shearing relation to the lower surface of the latter, whereby transistor leads projecting downwardly through said apertures may be simultaneously cut off by shearing coaction of the two levers.

2. The device as defined in claim 1 together with adjustable means mounting said gauge plate on said first lever for raising and lowering the gauge plate relative to the first lever, whereby to correspondingly vary the distance from the lower surface of the first lever to the top of the gauge plate and accordingly vary the cut off length of transistor leads.

3. The device as defined in claim 1 wherein said recess is also open at one side edge of said gauge plate.

4. The device as defined in claim 1 together with pivot means connecting said first and second levers together, and resilient means biasing said levers apart about said pivot means.

5. The device as defined in claim 4 together with means for limiting movement of said levers apart from each other under the action of said resilient biasing means.

6. The device as defined in claim 1 together with a pair of transistor gripping jaws provided on the respective levers, said jaws having concave jaw faces.

References Cited

UNITED STATES PATENTS

| | | | |
|---|---|---|---|
| 2,249,515 | 7/1941 | Carroll | 30—254 X |
| 2,957,242 | 10/1960 | Buchalter | 30—254 |

WILLIAM FELDMAN, *Primary Examiner.*

G. WEIDENFELD, *Assistant Examiner.*